(12) United States Patent
Junk

(10) Patent No.: US 6,480,750 B2
(45) Date of Patent: Nov. 12, 2002

(54) CONTROLLING SYSTEM AND METHOD FOR OPERATING A CONTROLLING SYSTEM

(75) Inventor: Rainer Junk, Grossenseebach (DE)

(73) Assignee: Siemens Aktiengesellschaft, Munich (DE)

(*) Notice: Subject to any disclaimer, the term of this patent is extended or adjusted under 35 U.S.C. 154(b) by 90 days.

(21) Appl. No.: 09/756,531

(22) Filed: Jan. 8, 2001

(65) Prior Publication Data

US 2001/0012969 A1 Aug. 9, 2001

Related U.S. Application Data

(63) Continuation of application No. PCT/DE99/02057, filed on Jul. 2, 1999.

(30) Foreign Application Priority Data

Jul. 7, 1998 (DE) .......................................... 198 30 341

(51) Int. Cl.[7] .............................................. G05B 13/02
(52) U.S. Cl. ........................... 700/34; 700/42; 700/289
(58) Field of Search .............................. 700/28, 33, 34, 700/40–42, 287, 289, 52

(56) References Cited

U.S. PATENT DOCUMENTS

| | | | |
|---|---|---|---|
| 4,292,534 A | 9/1981 | Diegel et al. | 290/40 R |
| 4,748,814 A | 6/1988 | Tanji et al. | 60/664 |
| 5,610,843 A | 3/1997 | Chou | 364/553 |
| 5,719,791 A * | 2/1998 | Neumeier et al. | 364/574 |
| 5,784,300 A * | 7/1998 | Neumeier et al. | 364/574 |

FOREIGN PATENT DOCUMENTS

| | | |
|---|---|---|
| DE | 34 45 791 C2 | 6/1985 |
| JP | 09120303 A | 5/1997 |

OTHER PUBLICATIONS

Gaviphat Lekutai et al.: "Self–Tuning Control of Nonlinear Systems Using Neural Network Adaptive Frame Wavelets", 1997 International Conference on Systems, Man and Cybernetics, vol. 2, Oct. 12, 1997, pp. 1017–1022.

Otto Föllinger: "Regelungstechnik" [control technology], Hüthig Buch Verlag, Heidelberg, 6th ed., 1990, pp. 14–20.

"Automatisierungstechnik" [automation technology], vol. 2, 1996, pp. 64–66.

* cited by examiner

Primary Examiner—Paul P. Gordon
(74) Attorney, Agent, or Firm—Laurence A. Greenberg; Werner H. Stemer; Ralph E. Locher

(57) ABSTRACT

A controlling system having a controller which acts on a controlled system as a function of a manipulated variable and a number of controller parameters is intended to provide a given control quality and a given control response in all operating states of the controlled system. For this purpose, the response characteristic of the controlled system is determined in a given time window during operation of the controller by comparing a wavelet transformation of the temporal response of the manipulated variable with a wavelet transformation of the temporal response of a controlled variable of the controller. An instant assigned to the respective wavelet transformation is detected, and the or each controller parameter is set as a function of the response characteristic.

8 Claims, 2 Drawing Sheets

CONTROLLING SYSTEM AND METHOD FOR OPERATING A CONTROLLING SYSTEM

CROSS-REFERENCE TO RELATED APPLICATION

This application is a continuation of copending International Application No. PCT/DE99/02057, filed Jul. 2, 1999, which designated the United States.

BACKGROUND OF THE INVENTION

Field of the Invention

The invention relates to a controlling system and to a method for operating a controlling system having a controller which acts on a controlled system with the aid of a manipulated variable as a function of a number of controller parameters.

A technical plant usually has a number of controlling systems whose purpose is to ensure an undisturbed operation of the plant. Such a controlling system usually acts on an associated controlled system so as to produce a closed control loop. In this case, for example, a sensor at the measuring point of the controlled system measures the controlled variable to be observed. If, due to a disturbance variable, the controlled variable deviates from a prescribed desired value, the controller of the controlling system acts with the aid of its manipulated variable on an actuator assigned to the controlled system. The manipulated variable supplied by the controller depends in this case on the deviation of the measured controlled variable from the prescribed desired value and further depends on a number of controller parameters via which it is possible, for example, to set the reaction rate and/or the setting accuracy of the controller.

Because of a lack of systematic knowledge of the real dynamic response of the controlled system, the setting of the controller parameters—the so-called parameterization—of such a controller is usually based on empirically obtained data which are determined, for example, when the plant is put into operation. These data are used to prescribe, for the respective controller, controller parameters which are retained unchanged during further operation. However, in the case of such a controlling system, a variation in the properties of the controlled system can lead to an impairment or deterioration of the control quality, in particular to impairment of the setting accuracy and/or of the rate of reaction of the controller. variations in the properties of the controlled system can occur in this case, in particular, from a change in load point or a change in the machine characteristic, for example because of aging or pollution.

The book by O. Völlinger, Regelungstechnik [Control engineering], 6th edition, Huttich Buchverlag Heidelberg, 1990, Chapter 1.6, pages 14 to 20, discloses an adaptive control method in which the variable system performance caused by fluctuating parameters of the controlled system is firstly detected in a suitable way, and the controller parameters are fixed with the aid of the information thus obtained.

Furthermore, U.S. Pat. No. 5,610,843 discloses the use of wavelet transformations for the purpose of characterizing controlled systems. The use of wavelet transformations is also discussed in Japanese Patent Application JP 09120303.

Furthermore, German Patent DE 34 45 791 discloses a steam turbine generator system in which the vapor pressure and the temperature can be controlled.

The article entitled "Self-tuning control of nonlinear systems using neural network adaptive frame wavelets", which was published in the 1997 International Conference on systems man and cybernetics, volume 2, Oct. 12, 1997, pages 1017–1022, describes a special neural network with the aid of which a dynamically varying plant operation can be controlled. In accordance with the mathematical model presented therein, a wavelet transformation of an input function is performed for the process. This wavelet transformation is a basis for estimating an output function. The estimated output function is optimized by iteration steps by comparing the estimated output function with a measured output function, in order to be able to control the plant suitably.

SUMMARY OF THE INVENTION

It is accordingly an object of the invention to provide a method for operating a controlling system, which maintains the control quality and control response of the control loop even in the case of a variation in the properties of the controlled system. It is a further object of the invention to provide a controlling system having an improved control quality and control response.

With the foregoing and other objects in view there is provided, in accordance with the invention, a method for operating a controlling system, the method includes the steps of:

acting, with a controller of a controlling system, on a controlled system by using a manipulated variable, the controller acting in dependence of a plurality of controller parameters;

determining a response characteristic of the controlled system during operation of the controller by comparing a wavelet transformation of a temporal response of the manipulated variable with a wavelet transformation of a temporal response of a controlled variable of the controller in a given time window;

ascertaining respective instants assigned to the wavelet transformation of the temporal response of the manipulated variable and to the wavelet transformation of the temporal response of the controlled variable; and setting at least one of the controller parameters as a function of the response characteristic.

In other words, the object of the invention is achieved by virtue of the fact that the response characteristic of the controlled system is determined in a prescribable time window during operation of the controller by comparing a wavelet transformation of the temporal response of the manipulated variable with a wavelet transformation of the temporal response of a controlled variable of the controller of the controlled system, an instant assigned to the respective wavelet transformation being detected, and the or each controller parameter being set as a function of the response characteristic determined.

The invention is based on the consideration that in the event of a change in the properties of the controlled system, the control quality and the control response of the control loop are maintained even when the variation in the response of the controlled system is detected and used to adapt the controller parameters. The response characteristic of the controlled system is particularly suitable in this case for characterizing the controlled system. A variation in the response characteristic of the controlled system should therefore act on the controller parameters. In order to avoid impairment of the functionality of the controlled system, in this case the resetting of the controller parameter or parameters is performed as a function of the determined response characteristic of the controlled system in the manner of an online intervention during operation of the controller.

A wavelet transformation is used in this case to determine the response characteristic of the controlled system during operation of the controlling system. In this case, the temporal variation of the manipulated variable and of a controlled variable of the controller of the controlled system are analyzed in the same way in a prescribable time window with the aid of a wavelet transformation. The method of wavelet transformation is described, for example, in the journal Automatisierungstechnik [automation technique], edition 2, 1996, R. Oldenbourg publishers, pages 64 to 66.

With this analysis it can be established whether a prescribable component of the manipulated variable is included in the controlled variable. This is performed by decomposing the manipulated variable or the control variable into components of a so-called wavelet family in a prescribable time window at a specific instant or point in time. A wavelet family is a family of mathematical functions which are generated by mathematical stretching and/or displacement from a single output function. The mathematical stretching and/or displacement of the function in this case signifies adaptation to various frequency and amplitude components of a signal to be investigated. The time when the variable to be investigated has specific properties can be determined in this case on the basis of the presence of prescribable wavelet components within the framework of the prescribable time window.

The response characteristic of the controlled system is determined in this case by comparing the wavelet transformation of the temporal response of the manipulated variable with the wavelet transformation of the temporal response of the controlled variable. For this purpose, the result of the analysis of the manipulated variable and of the controlled variable is transferred into a system of differential equations. The formulation of the system of differential equations serves to establish a mathematical function which characterizes the response characteristic of the controlled system.

An instant assigned to the wavelet transformation is detected with each determination of the response characteristic of the controlled system. It is thereby possible to document changes in the response characteristic of the controlled system. It is possible in this way for the controlling system to be adapted particularly simply to prescribable operating states of the controlled system which keep reoccurring during operation of the controlled system.

The method is advantageously applied to a controlling system which is part of a steam turbine plant. Specifically, the controllers of the control loop of a steam turbine plant are usually parameterized with the aid of empirically obtained data. Because of a lack of systematic knowledge of the real dynamic response of the respective steam turbine plant, long commissioning times occur in this case. Again, as a rule the controller parameters are not adapted to different operating states of the steam turbine plant during operation of the steam turbine plant. Readjusting or tracking of the controller parameters of the or each controller of the steam turbine plant during operation of the steam turbine plant therefore ensures particularly a constant control quality and a constant control response of the or each control loop.

The manipulated variable of the controller is advantageously a wheel chamber pressure value or a steam mass flow value of the steam turbine. In an advantageous embodiment, the controlled variable of the control loop is, furthermore, a power value, a speed value or a pressure value of the working medium of the steam turbine.

With the objects of the invention in view there is also provided, in combination with a controlled system having a response characteristic, a controlling system, including:

a controller connected to the controlled system, the controller operating in dependence of a plurality of controller parameters, and the controller acting, with a manipulated variable, on the controlled system;

a controller adaption device connected to the controller;

the controller adaption device determining the response characteristic of the controlled system during operation of the controller by comparing a wavelet transformation of a temporal response of the manipulated variable with a wavelet transformation of a temporal response of a controlled variable of the controller in a given time window;

the controller adaption device ascertaining respective instants assigned to the wavelet transformation of the temporal response of the manipulated variable and to the wavelet transformation of the temporal response of the controlled variable; and the controller adaption device setting at least one of the controller parameters as a function of the response characteristic.

In other words, the object of the invention is achieved with the aid of a controller adapter which determines the response characteristic of the controlled system during operation of the controller, and sets the or each control parameter as a function of the currently determined response characteristic of the controlled system.

The advantages achieved with the invention are, in particular, that by readjusting or directing the controller parameters in the sense of an auto-tracking during operation of the controller ensures a given control quality for all operating states of the controlled system. This is performed without interrupting the operation of the controlling system. Moreover, technical plants which include the controlling system and apply the method have particularly short commissioning times when the plant is put into operation.

Again, controlling systems operated with the aid of the method according to the invention can be adapted with particular ease to different operating states of the controlled system.

Other features which are considered as characteristic for the invention are set forth in the appended claims.

Although the invention is illustrated and described herein as embodied in a method for operating a controlling system, and a device for carrying out the method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
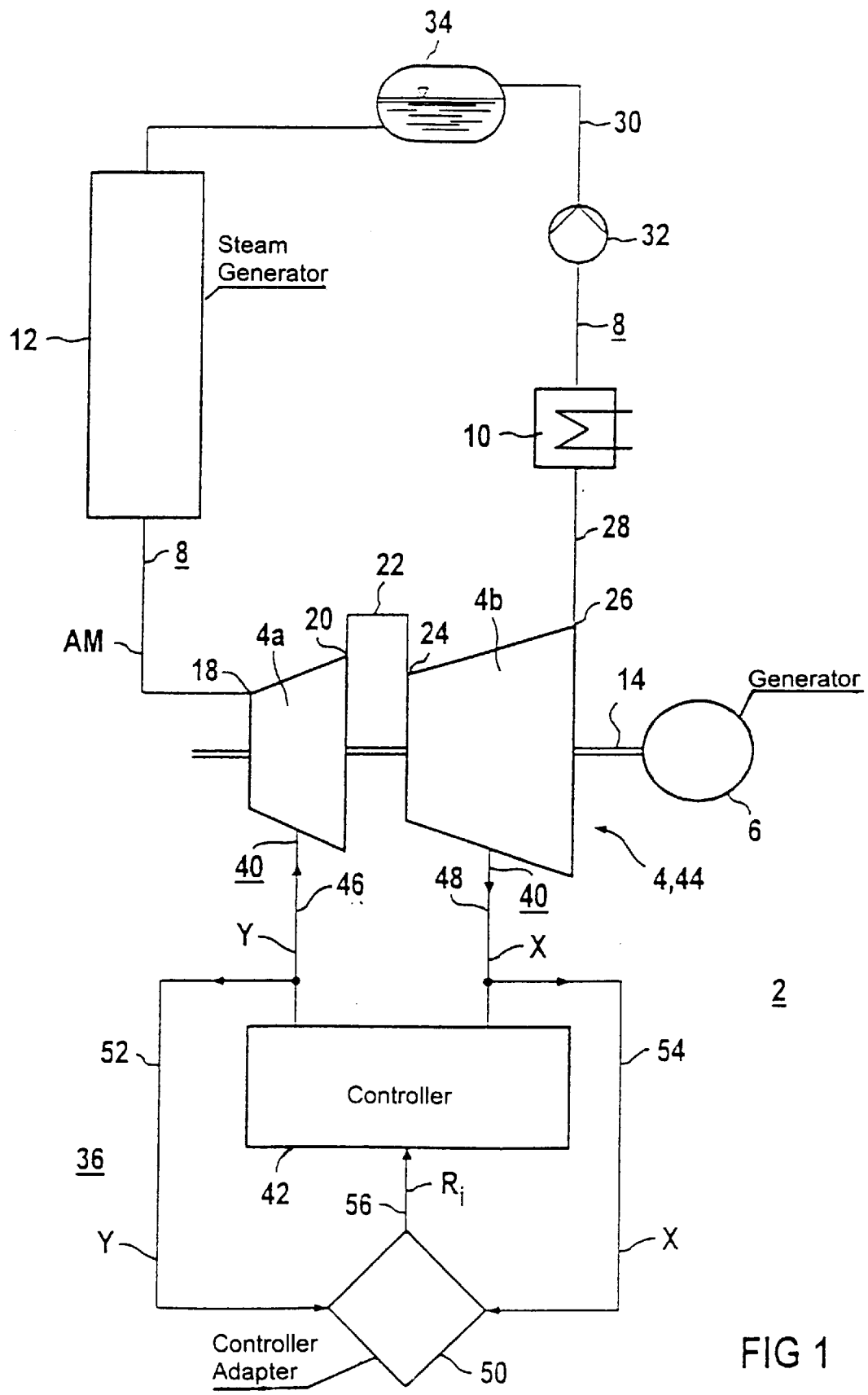
FIG. 1 is a schematic block diagram of a steam turbine plant with a controlling system according to the invention.

Referring now to the figures of the drawings in detail, in which identical elements are indicated with identical reference symbols, and first, particularly, to FIG. 1 thereof, there is shown a steam turbine plant 2. The steam turbine plant 2 includes a steam turbine 4 with a generator 6 coupled thereto and, in a water/steam circuit 8, a condenser 10, connected downstream of the steam turbine 4, and a steam generator 12. The steam turbine 4 includes a first pressure stage or a high pressure (HP) section 4a and a further stage or an intermediate (IP) and low pressure (LP) section 4b, which drive the generator 6 via a common shaft 14.

In order to feed a working medium AM to the steam turbine 4, the steam generator 12 is connected on its steam outlet side to the steam inlet 18 of the high pressure section 4a of the steam turbine 4. The steam outlet 20 of the high pressure section 4a of the steam turbine 4 is connected via a cross-over pipe 22 to the steam inlet 24 of the intermediate pressure and low pressure section 4b of the steam turbine 4. The steam outlet 26 of the intermediate pressure and low pressure section 4b of the steam turbine 4 is connected via a steam pipe 28 to the condenser 10. Via a feedwater pipe 30, into which a feedwater pump 32 and a feedwater tank 34 are connected, the condenser is connected to the steam generator 12 so as to produce a closed water/steam circuit 8.

The steam turbine plant 2 is assigned a controlling system 36 for the purpose of controlling a power value P, a speed value N and/or a pressure value W of the working medium AM for the steam turbine 4. The controlling system 36 is part of a control loop 40, and includes a controller 42. The latter is connected to a controlled system 44 in order to form the control loop 40. The controlled system 44 assigned to the controller 42 includes the steam turbine 4 in this case. In order to feed a manipulated variable Y, the controller 42 is connected via the manipulated-variable line 46 to the controlled system 44 assigned to it. An actuator assigned to the controlled system 44 accomplishes a specific setting of the controlled system 44 as a function of the manipulated variable Y. The controlled variable X can be fed to the controller 42 via the controlled-variable line 48 so as to produce a closed control loop 40.

The controller 42 is configured in such a way that it can vary the manipulated variable Y to be fed to the controlled system 44 in a way which is proportional, integral and/or differential in the event of a deviation of the controlled variable X from a prescribable desired value. The manipulated variable supplied by the controller is therefore a function of a number of controller parameters $R_i$ (i=1, 2, ..., n). The setting of the controller parameters $R_i$ is the so-called parameterization of the controller 42.

The controlling system 36 has a controller adapter 50 for determining controller parameters $R_i$, so that there is a particularly favorable parameterization of the controller 42 for all operating states of the steam turbine plant 2. For this purpose, the controller adapter 50 can be fed the manipulated variable Y via the connecting line 52 branching off from the manipulated-variable line 46, and can be fed the controlled variable X via the connecting line 54 branching off from the controlled-variable line 48. The controller adapter 50 is connected via the controller line 56 to the controller 42 assigned to it in order to feed controller parameters $R_i$ determined in the controller adapter 50.

Figure 2:
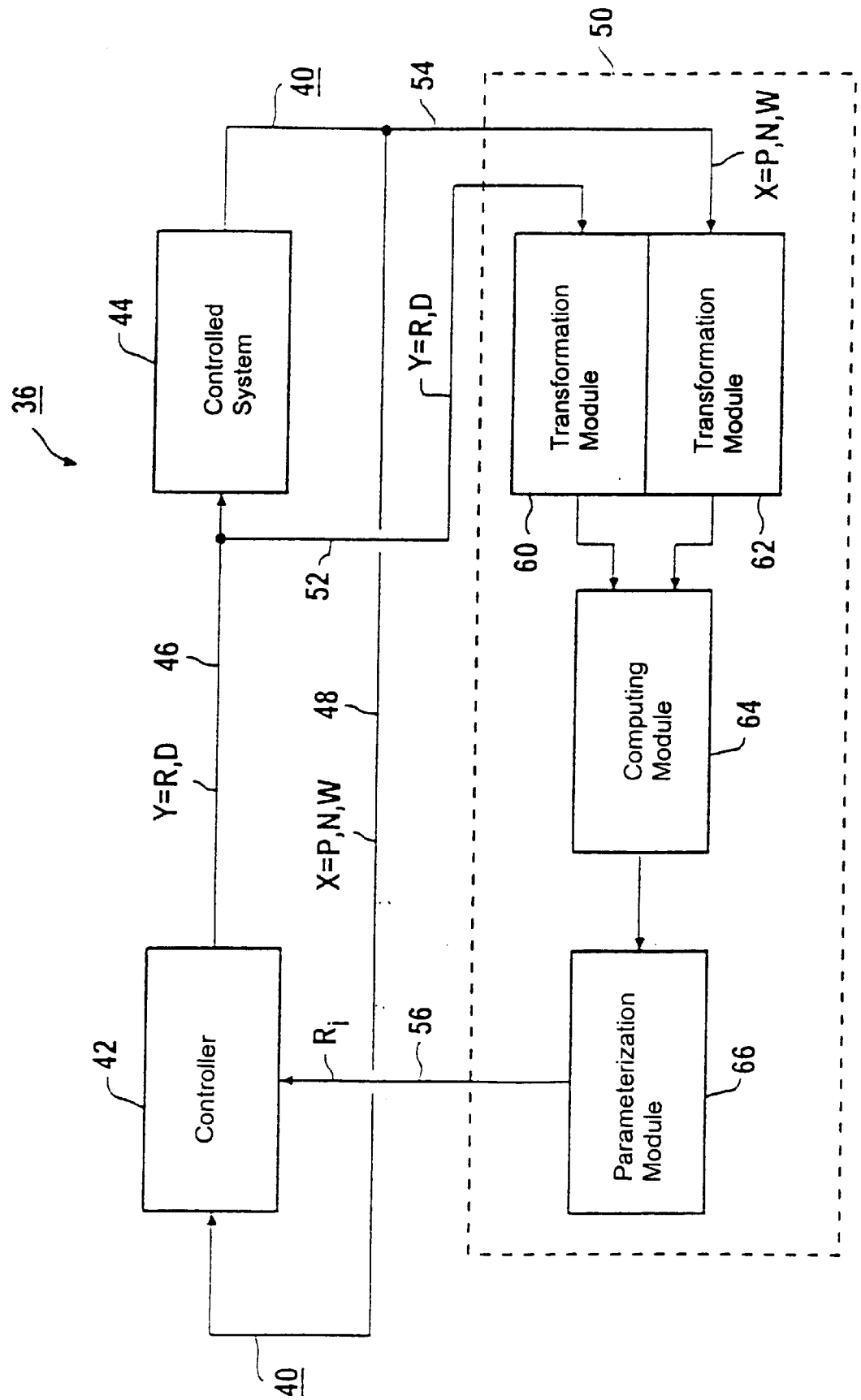
FIG. 2 is a block diagram of the controlling system according to the invention.

As illustrated in further detail in FIG. 2, the controller adapter 50 is connected to the control loop 40 via the connecting line 52 or 54, respectively, branching off from the manipulated-variable line 46 or from the controlled-variable line 48. The controller adapter 50 includes a transformation module 60 for analyzing the manipulated variable Y, a transformation model 62 for analyzing the controlled variable X, a computing module 64 for determining the transfer function of the controlled system 44, and a parameterization module 66 for determining the controller parameters $R_i$. The transformation module 60 is connected with the aid of the connecting line 52, and the transformation module 62 with the aid of the connecting line 54. The transformation modules 60 and 62 are, in turn, connected to the computing module 64 for transferring data. The computing module 64 is, in turn, likewise connected to the parameterization module 66 for transferring data. The controller parameters $R_i$ determined in the parameterization module 66 can be fed to the controller 42 via the controller line 56.

During operation of the steam turbine plant 2, the steam turbine 4 is operated with the aid of the controlling system 36. In this case, a wheel chamber pressure value R or a steam mass flow value D of the steam turbine 4 serve as manipulated variables. The associated controlled variables are a power value P, a speed value N or a pressure value W of the steam turbine 4. The power value P of the steam turbine can therefore be controlled, for example, by a corresponding setting of the wheel chamber pressure value R. In a way not explained in more detail, a given desired value of the power value P is set for the controller 42. With the aid of the controller parameters $R_i$, the controller 42 relays a wheel chamber pressure value R, as a manipulated variable Y, in turn to the actuator (not illustrated) via the manipulated-variable line 46. This actuator in turn accomplishes a change in the response of the controlled system 44 which is caused by the controller 42. The actual value of the power value P of the controlled system 44 is relayed to the controller 42 as controlled variable X via the controlled-variable line 48.

In order to ensure a prescribable control quality of the control loop 40 for all operating states of the steam turbine plant 2, variations in the response of the controlled system 44 are detected and used for adapting the controller parameters $R_i$. This is performed by determining the response characteristic of the controlled system 44 during operation of the controller 42. The updating of the or each controller parameter $R_i$ then takes place as a function of the determined response characteristic of the controlled system 44 during operation of the controller 42.

For this purpose, the manipulated variable Y is relayed to the transformation module 60 of the controller adapter 50 via the connecting line 52. At the same time, the controlled variable X is relayed to the transformation module 62 of the controller adapter via the connecting line 54. The transformation module 60 decomposes the manipulated variable Y, which is fed to the controlled system 44, with the aid of a wavelet transformation in a prescribable time window at a specific instant into signal components, also denoted as wavelet components, of an amplitude spectrum of a specific frequency band. This is performed with the aid of a family of wavelets. A family of wavelets is a family of mathematical functions which are produced by mathematical stretching and/or displacement from a single output function. The analysis of the temporal response of the signal is performed in this case in a prescribable time window. It is possible thereby to determine the instant at which the signal has exhibited a specific property filtered out by the wavelet transformation. This method can therefore be used to establish whether a prescribable component of the signal is included in the signal at a specific instant.

In the same way as the transformation module 60 analyzes the manipulated variable Y, the transformation module 62 investigates the temporal response of the controlled variable X. It can be established thereby whether a prescribable component of the manipulated variable Y is to be found in the controlled variable X. It is possible in this case to locate the instant at which the manipulated variable Y or the controlled variable X had a specific component. Changes in the manipulated variable Y and/or in the controlled variable X can thereby be classified temporally.

Moreover, an instant is assigned to the respective wavelet transformation. Variations in the response of the controlled system 44 can be established thereby. Specific controller parameters $R_i$, which have proved to be particularly favorable, an then be set in the case of recurring states of the steam turbine 4.

The result of the wavelet transformations of the manipulated variable Y and the controlled variable X is relayed to the computing module 64. There, the result serves the purpose of setting up a system of differential equations. The determination, carried out in the computing module 64, of the system of differential equations establishes the transfer function of the controlled system 44. The transfer function of the controlled system 44 is relayed to the parameterization module 66. If necessary, new controller parameters $R_i$ are calculated there. To reset or readjust the controller parameters $R_i$ of the controller 42, the controller parameters $R_i$ are fed, via the controller line 56, to the controller 42 during operation of the controller 42.

In the controlling system 36 of the steam turbine plant 2, the response characteristic of the controlled system 44 is determined during operation of the controller 42. The or each controller parameter $R_i$ is then set as a function of the determined response characteristic of the controlled system 44, in the manner of an online intervention. This ensures a prescribable control quality and a prescribable control response of the controlling system 36 for all operating states of the steam turbine plant 2.

I claim:

1. A method for operating a controlling system, the method which comprises:
    acting, with a controller of a controlling system, on a controlled system by using a manipulated variable, the controller acting in dependence of a plurality of controller parameters;
    determining a response characteristic of the controlled system during operation of the controller by comparing a wavelet transformation of a temporal response of the manipulated variable with a wavelet transformation of a temporal response of a controlled variable of the controller in a given time window;
    ascertaining respective instants assigned to the wavelet transformation of the temporal response of the manipulated variable and to the wavelet transformation of the temporal response of the controlled variable; and
    setting at least one of the controller parameters as a function of the response characteristic.

2. The method according to claim 1, which comprises providing the controlling system in a steam turbine plant.

3. The method according to claim 1, which comprises using a wheel chamber pressure value of a steam turbine as the manipulated variable.

4. The method according to claim 1, which comprises using a steam mass flow value of a steam turbine as the manipulated variable.

5. The method according to claim 1, which comprises using a power value of a steam turbine as the controlled variable.

6. The method according to claim 1, which comprises using a speed value of a steam turbine as the controlled variable.

7. The method according to claim 1, which comprises using a pressure value of a working medium of a steam turbine as the controlled variable.

8. In combination with a controlled system having a response characteristic, a controlling system, comprising:
    a controller connected to the controlled system, said controller operating in dependence of a plurality of controller parameters, and said controller acting, with a manipulated variable, on the controlled system;
    a controller adaption device connected to said controller;
    said controller adaption device determining the response characteristic of the controlled system during operation of said controller by comparing a wavelet transformation of a temporal response of the manipulated variable with a wavelet transformation of a temporal response of a controlled variable of said controller in a given time window;
    said controller adaption device ascertaining respective instants assigned to the wavelet transformation of the temporal response of the manipulated variable and to the wavelet transformation of the temporal response of the controlled variable; and
    said controller adaption device setting at least one of the controller parameters as a function of the response characteristic.

* * * * *